United States Patent [19]

Kitabayashi et al.

[11] Patent Number: 5,178,497
[45] Date of Patent: Jan. 12, 1993

[54] ELECTRODEPOSITED REAMER TOOL

[75] Inventors: Hiroyuki Kitabayashi; Tadayuki Ishikawa; Hiroyuki Kuroda; Yoshihiko Nakakoji; Masaki Nobuhara, all of Osaka, Japan

[73] Assignee: Kabushiki Kaisha Komatsu Seisakusho, Tokyo, Japan

[21] Appl. No.: 474,061

[22] PCT Filed: Aug. 30, 1989

[86] PCT No.: PCT/JP89/00888
§ 371 Date: Apr. 26, 1990
§ 102(e) Date: Apr. 26, 1990

[87] PCT Pub. No.: WO90/02012
PCT Pub. Date: Mar. 8, 1990

[30] Foreign Application Priority Data

| Aug. 30, 1988 | [JP] | Japan | 63-113908[U] |
| Aug. 31, 1988 | [JP] | Japan | 63-115511[U] |
| Sep. 20, 1988 | [JP] | Japan | 63-123046[U] |
| Nov. 18, 1988 | [JP] | Japan | 63-150461[U] |
| Nov. 18, 1988 | [JP] | Japan | 63-291695 |

[51] Int. Cl.$^5$ .............................. B23B 51/02
[52] U.S. Cl. ......................... 408/145; 51/206 R; 428/59
[58] Field of Search .......... 51/206 R, 290, 206 P, 51/206.4; 76/DIG. 11, DIG. 12, 115, 101.1; 408/144, 149, 57, 59, 230

[56] References Cited

U.S. PATENT DOCUMENTS

| Re. 24,769 | 1/1960 | Willingham | 408/59 |
| 3,510,990 | 5/1970 | Steindler | 51/356 X |
| 4,757,645 | 7/1988 | Ozer et al. | 51/206 R |

FOREIGN PATENT DOCUMENTS

| 237973 | 9/1911 | Fed. Rep. of Germany | 51/206 R |
| 8804567 | 4/1988 | Fed. Rep. of Germany | |
| 1-97571 | 4/1989 | Japan | |
| 157196 | 10/1963 | U.S.S.R. | 51/206 R |
| 384660 | 10/1973 | U.S.S.R. | 51/204 |
| 2192356 | 1/1988 | United Kingdom | |

OTHER PUBLICATIONS

K. Yegenoglu, et al., "Dornhonen-alternative Bohrungsbearbeitung", Werkstatt und Betrieb, vol. 20, No. 7, Jul. 1987., pp. 561–564.

Indistrual Diamond Review, vol. 47, No. 520, Mar. 1987, "Good Surface Finish With Electroplated CBN Wheels".

Primary Examiner—Daniel W. Howell
Attorney, Agent, or Firm—Spensley, Horn, Jubas & Lubitz

[57] ABSTRACT

The present invention relates to an electrodeposited reamer tool (1) for use in precision bore processing.

In this electroplated reamer tool (1), a work processing portion (3) in a reamer body is constituted by a finishing portion (4) having a cylindrical outer peripheral surface and a cutting portion (5) provided on the distal end side of the finishing portion (4) and having a tapered configuration, and abrasive grains (6) are electrodeposited on the outer peripheral surfaces of the finishing portion (4) and the cutting portion (5).

In the electrodeposited reamer tool (1) is inserted into a prepared hole provided in a work, the prepared hole is enlarged by the cutting portion (5), and the inner surface of the bore is finished by the finishing portion (4).

Accordingly, it is possible to form a precision bore of a predetermined inner diameter in a work without preprocessing the prepared hole with precision.

7 Claims, 9 Drawing Sheets

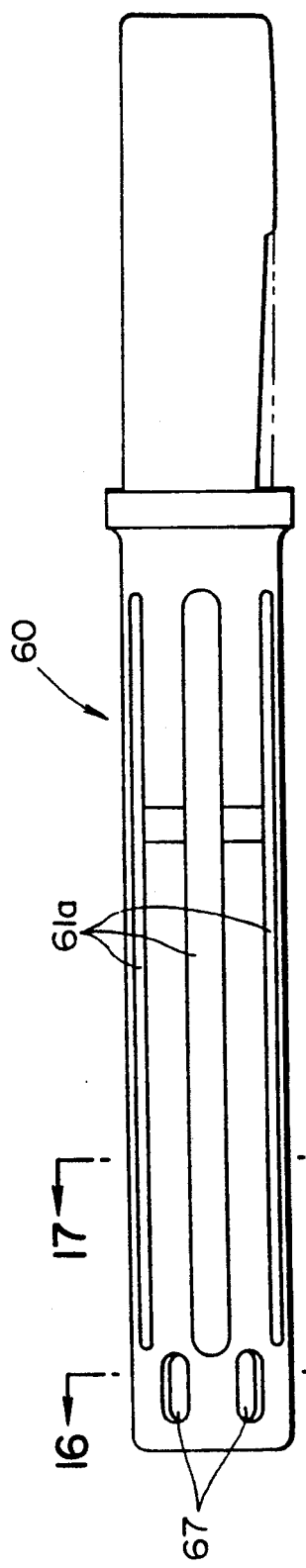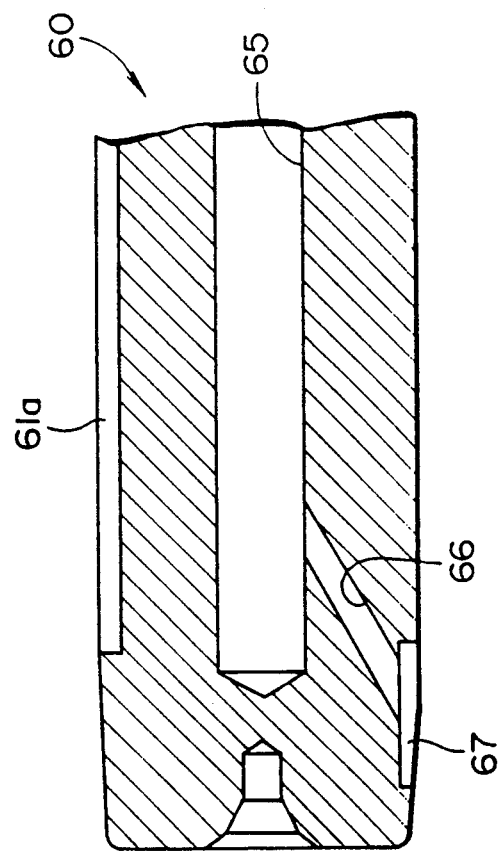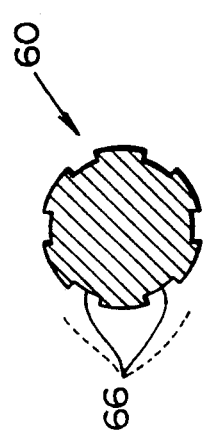

R: RADIUS OF TOOL TIP (BASE METAL)

ELECTRODEPOSITED REAMER TOOL

TECHNICAL FIELD

The present invention relates to an electrodeposited reamer tool for use in precision processing of bores.

BACKGROUND ART

As a conventionally employed electrodeposited reamer, for example, a lapping reamer disclosed in Japanese Utility Model Laid-Open No. 53427/1985 (filed by Takezawa Seiki) is known.

As shown in FIG. 22, as for the aforementioned reamer A, a work processing portion C provided at an end portion of a reamer body (base metal) B is formed cylindrically over its entire length. The arrangement provided is such that abrasive grains D are electrodeposited on an external peripheral surface of this processing portion C, and an unillustrated pressing member sealed in the processing portion C is screwed in for expanding the diameter by means of a set bolt provided at an end portion so as to set its diameter, thereby obtaining surface accuracy by controlling the electrodeposited abrasive grain size. It should be noted that, in the drawing, reference character E denotes a slit formed in the work processing portion C.

With the above-described electrodeposited reamer tool A, however, since its portion where the processing abrasive grains are electrodeposited, i.e., the work processing portion C, has a cylindrical shape, as mentioned above, it is impossible to provide a large machining allowance for a pre-processing hole which is formed in a work.

In addition, with the above-described electrodeposited reamer tool A, since the surface roughness is adjusted by controlling the processing abrasive grain diameter, it is necessary to set to a small dimension the machining allowance of the pre-processing hole which is formed in the work, in conjunction with the improvement of the surface roughness.

Accordingly, in order to effect precision processing of bores by using the above-described electrodeposited reamer tool A, it is necessary to preprocess the work with pre-processing bores having dimensional accuracy and surface roughness that are close to targets. For this reason, there has been a drawback in that the process for preprocessing becomes very complicated.

In view of the above-described situation, it is an object of the present invention to provide an electrodeposited reamer tool which is capable of effecting precision processing of bores with high efficiency without requiring a complicated preprocessing step.

DISCLOSURE OF THE INVENTION

An electrodeposited reamer tool in accordance with the present invention is characterized by comprising: a finishing portion having a cylindrical outer peripheral surface; and a cutting portion provided on a distal end side of the finishing portion and having a tapered configuration, wherein abrasive grains are electrodeposited on the outer peripheral surfaces of the two processing portions, respectively.

In accordance with this arrangement, by inserting the electrodeposited reamer tool into a prepared hole provided in a work, the prepared hole is enlarged by the cutting portion and is concurrently finished to a desired bore diameter by the finishing portion.

Accordingly, in accordance with the above-described electrodeposited reamer tool, it becomes possible to provide a large machining allowance for the prepared hole, so that it becomes unnecessary to pre-process the prepared hole with precision, and the pre-processing step is hence extremely facilitated.

BRIEF DESCRIPTION OF THE DRAWINGS

FIG. 15 is an overall side-elevational view of a reamer body in the electrodeposited reamer tool of the sixth embodiment;

FIG. 16 is a cross-sectional view taken along the line A—A of FIG. 15;

FIG. 17 is a cross-sectional view taken along the line B—B of FIG. 15;

FIG. 18 is a cross-sectional view of an essential portion of the reamer body shown in FIG. 15;

BEST MODE FOR CARRYING OUT THE INVENTION

A detailed description of the present invention will be given hereinunder with reference to the drawings illustrating several embodiments shown in FIGS. 1 to 21.

Figure 1:
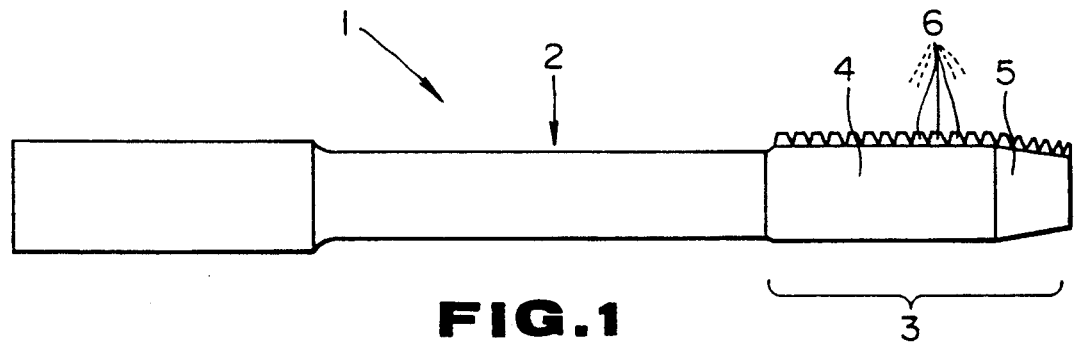
FIG. 1 is a conceptual overall side-elevational view illustrating a first embodiment of an electrodeposited reamer tool in accordance with the present invention.

In FIG. 1, a first embodiment of an electrodeposited reamer tool according to the present invention is shown.

This electrodeposited reamer tool 1 is constructed such that a work processing portion 3 of a reamer body 2 is constituted by a finishing portion 4 having a cylindrical outer peripheral surface and a cutting portion 5 provided on the distal end side of this finishing portion 4 and having a tapered configuration.

Both the finishing portion 4 and the cutting portion 5 are formed coaxially along a central axis of rotation of the reamer body 2, and a cross section perpendicular to the central axis of rotation shows a circular configuration. In addition, the cutting portion 5 is formed in such a manner that its proximal end is formed with the same diameter as the aforementioned finishing portion 4, and its diameter becomes gradually smaller toward the distal end. It should be noted that the outer peripheral surface of the cutting portion 5 is formed to be rectilinear in an axial cross section.

Abrasive grains 6 are secured to the outer peripheral surfaces of the finishing portion 4 and the cutting portion 5 by means of electrodeposition.

The abrasive grains 6 electrodeposited on the finishing portion 4 are trued and have flat cutting blades, while the abrasive grains 6 electrodeposited on the cutting portion 5 are not trued and have sharp cutting blades.

In cases where hole processing is effected by means of the electrodeposited reamer tool 1 having the above-described construction, if the electrodeposited reamer tool 1 is inserted into a prepared hole of a work, the prepared hole is first enlarged by the cutting portion 5. At this time, the cutting portion 5 in the tapered form has a guiding effect.

Then, if the electrodeposited reamer tool 1 is further inserted, the inner surface of the hole is finished by the finishing portion 4, so that a hole of a predetermined inner diameter is formed in the work.

That is, with the electrodeposited reamer tool 1 having the above-described construction, it is possible to form a hole having a predetermined inner diameter in a work without processing a prepared hole with precision.

Meanwhile, the abrasive grains 6 electrodeposited on the finishing portion 4 have flat cutting blades by being subjected to truing, and the inner surface of the diameter enlarged by the cutting portion 5 is ground by these flat cutting blades so as to determine the bore diameter, and correct surface roughness and roundness, and the like.

In addition, since the abrasive grains 6 electrodeposited on the finishing portion 4 have flat distal ends, the area of contact with the inner surface of the hole is large, so that even if the feeding speed of the reamer tool 1 is increased, the surface roughness of the inner surface of the hole is not deteriorated.

Here, a comparison between a case where hole processing is effected by using the electrodeposited reamer tool 1 in accordance with the present invention and a case where hole processing is effected using a conventional electrodeposited reamer tool is shown in Table 1.

TABLE 1

| | Conventional Tool | | Tool of the Invention |
|---|---|---|---|
| | Roughing | Finishing | |
| Feed mm/rev. | 0.25 | 0.15 | 2 |
| Machining allowance μm/φ | 25 | 15 | 100 |
| Surface roughness in pre-processing | 6 μm | | unaffected |
| Surface roughness, Rmax | 3.5 μm | 2 μm | 2 μm |
| Roundness | 5 μm | 2 μm | 2 μm |
| Cylindricity | 5 μm | 2 μm | 2 μm |

Processing dimensions: φ25 × 45L
Material to be cut: FC25

As is apparent from this Table, with the electrodeposited reamer tool 1 in accordance with the present invention, even if the machining allowance is made large and the feeding rate is increased, it is possible to obtain processing accuracy equivalent to that obtained by a conventional tool. In addition, although, with the conventional tool, a surface roughness of 6 μm or thereabouts is required in pre-processing, and one tool is needed in each of the two processes of roughing and finishing, with the electrodeposited reamer tool in accordance with the present invention, the surface roughness in pre-processing does not affect the processing, and the required accuracy can be attained by one tool.

Figure 2:
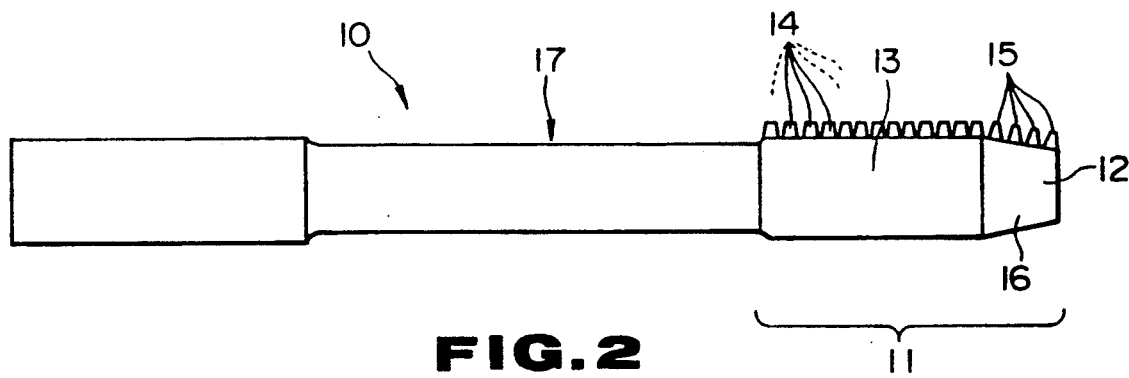
FIG. 2 is a conceptual overall side-elevational view illustrating a second embodiment.
Figure 3:
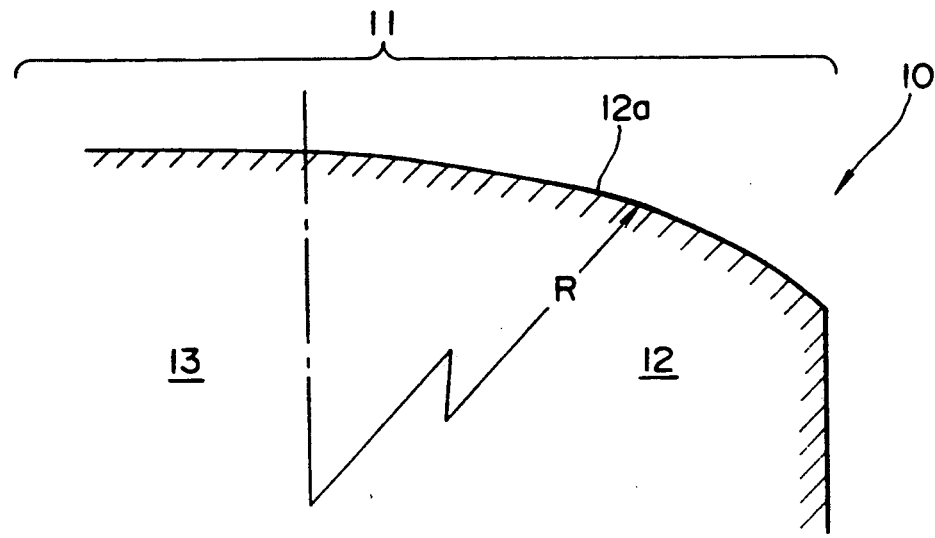
FIG. 3 is a cross-sectional side view of an essential portion of the electrodeposited reamer tool of the same.
Figure 4:
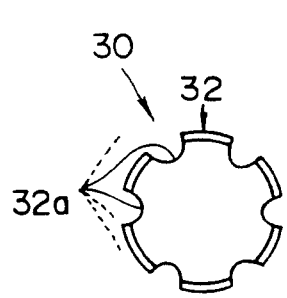
FIG. 4 is diagram of an end face of an electrodeposited reamer tool illustrating a third embodiment.
Figure 5:
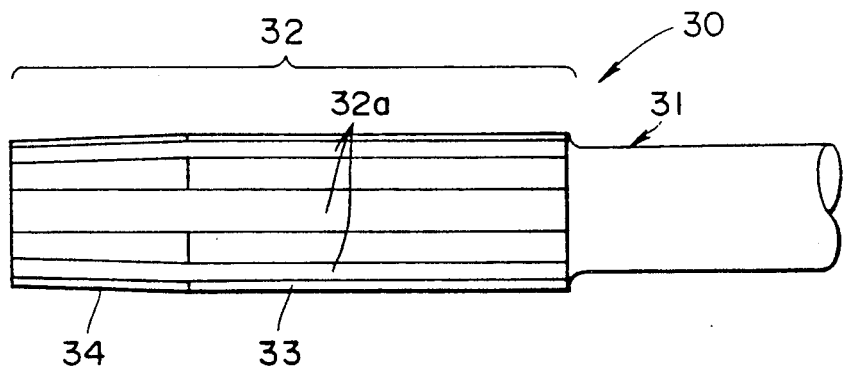
FIG. 5 is a side-elevational view of an essential portion of the electrodeposited reamer tool of the same.
Figure 6:
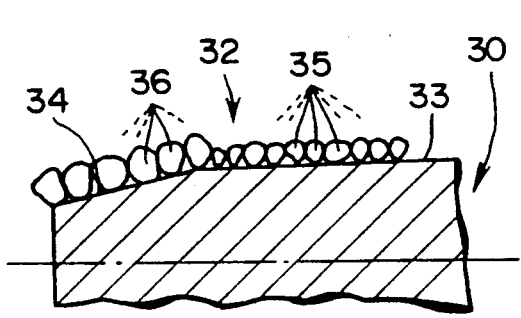
FIG. 6 is a cross-sectional side view of an essential portion illustrating a state in which abrasive grains are electrodeposited on a finishing portion and a cutting portion.

A second embodiment of the electrodeposited reamer tool in accordance with the present invention is shown in FIGS. 2 and 3.

As shown in FIG. 3, this electrodeposited reamer tool 10 is constructed such that an outer peripheral surface 12a of a cutting portion 12 in a work processing portion 11 is formed on its axial cross section into a curved line, i.e., by being curved, and ceramics such as TiN is coated on this cutting portion 12. It should be noted that the construction is basically similar to that of the electrodeposited reamer tool 1 of the first embodiment except for the configuration of the outer peripheral surface of the cutting portion and the arrangement of the ceramic coating. In FIG. 2, reference numeral 13 denotes a finishing portion; 17, a reamer body; 14, abrasive grains of the finishing portion; 15, abrasive grains of the cutting portion; and 16, a ceramic coating.

In cases where bore processing is effected by using the electrodeposited reamer tool 10 having the above-described construction, the frictional resistance between the cutting portion 12 and the inner peripheral surface of the prepared hole in the work is reduced by virtue of the action of the aforementioned ceramics. Accordingly, the generation of frictional heat is suppressed, and it is possible to obviate such drawbacks as the cuttings being deposited onto the cutting portion and hence resulting in the enlargement of the processed bore diameter, or a plucking being caused on the processed surface.

In addition, as for the ceramics such as TiN, the adhesive strength of cuttings is low compared with that of a nickel which is generally used for a plating layer for fixing abrasive grains. For this reason, removal of cuttings from chip pockets is facilitated, which also makes it possible to prevent in advance the enlargement of the processed bore diameter and the plucking on the processed surface.

Also, according to results of an experiment, in a case where bore processing is effected by using the electrodeposited reamer tool 10 in accordance with this embodiment, as compared with a case where bore processing is effected by using the electrodeposited reamer tool 1 of the first embodiment shown before, the surface roughness, roundness, and cylindricity were respectively identical at 2 μm, whereas even when the feeding rate was increased from 2 mm/rev. to 3 mm/rev., it was possible to obtain processing accuracy equivalent to that of the electrodeposited reamer tool 1 of the first embodiment. Namely, the processing efficiency can be increased by 1.5-fold. In this case, the material of the work used in the experiment was FC25, the processing dimensions were φ25×45 Lmm, and the peripheral speed was 20 m/min.

FIGS. 4 to 7 illustrate a third embodiment of an electrodeposited reamer tool in accordance with the present invention.

An electrodeposited reamer tool 30 is constructed such that a work processing portion 32 of a reamer body 31 is constituted by a finishing portion 33 having a cylindrical outer peripheral surface and a cutting portion 34 provided on the distal end side of this finishing portion 33 and having a tapered configuration. Furthermore, formed in the outer peripheral surface of the work processing portion 32 are a plurality of notches 32a, 32a, ... dividing the outer peripheral surface into equal parts and extending along a central axis of the reamer body 31.

Figure 7:
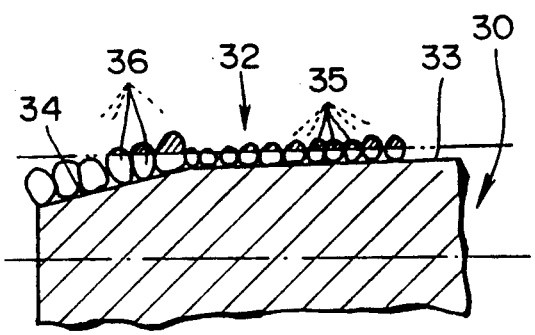
FIG. 7 is a cross-sectional side view of the essential portion subjected to truing.

Abrasive grains 35 having a relatively small grain size are secured to the outer peripheral surface of the aforementioned finishing portion 33 by means of deposition, while abrasive grains 36 having a greater grain size than the abrasive grains 35 are secured to the outer peripheral surface of the cutting portion 34 by means of deposition. It should be noted that in the third embodiment, as shown in FIG. 7, only the abrasive grains 35 electrodeposited on the finishing portion 33 are trued.

In accordance with the electrodeposited reamer tool 30 having the above-described construction, the abrasive grains 36 having a greater grain size on the cutting portion 34 cut off the prepared hole of the work with high efficiency, while the abrasive grains 36 having a smaller grain size on the finishing portion 33 and trued finish the inner surface of the bore smoothly. Incidentally, at the time of bore processing, the cuttings are discharged through the notches 32a, 32a, ... provided on the outer peripheral surface of the work processing portion.

Figure 9:
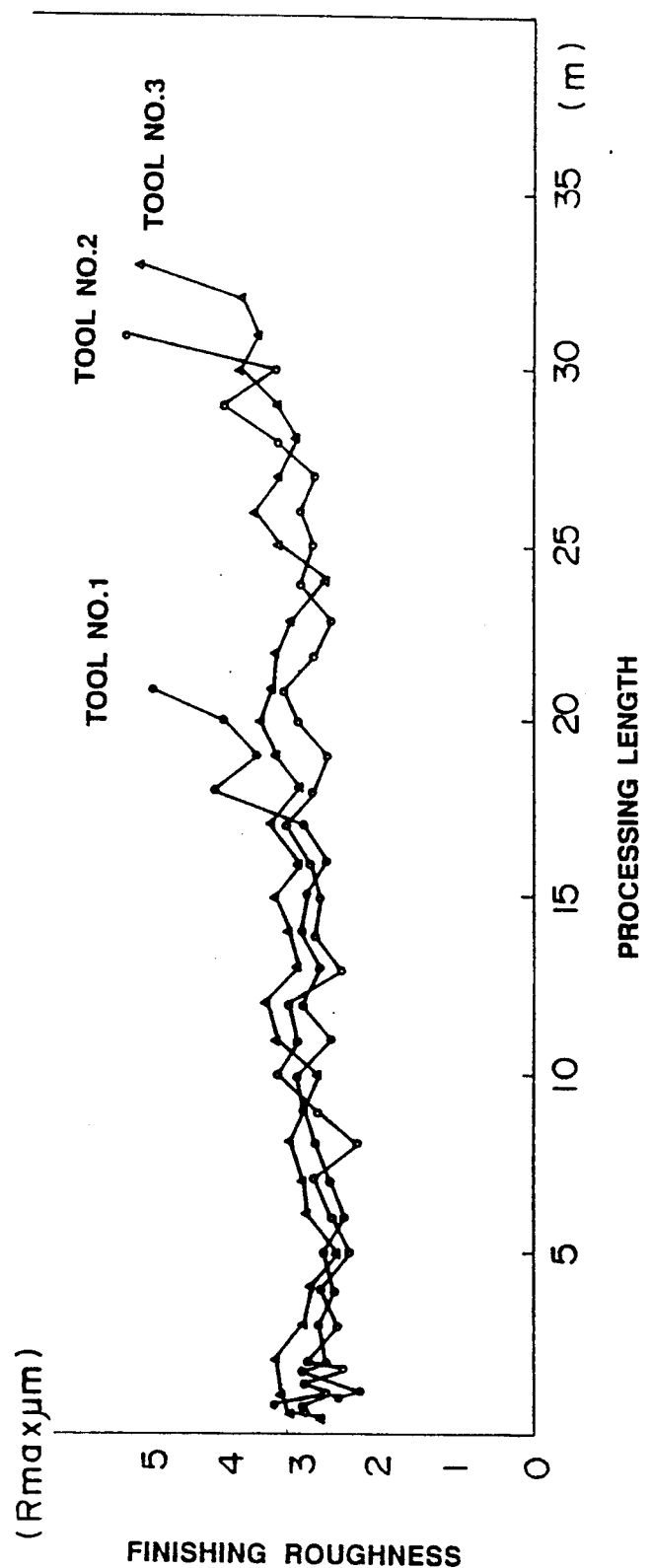
FIG. 9 is a graph illustrating the relationships the between finishing roughness and the processing length.
Figure 10:
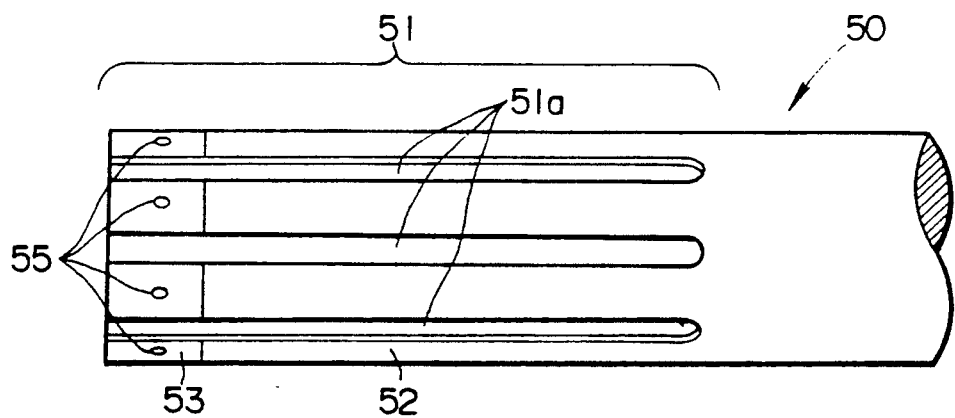
FIG. 10 is a side-elevational view of an essential portion of an electrodeposited reamer tool illustrating a fifth embodiment.
Figure 11:
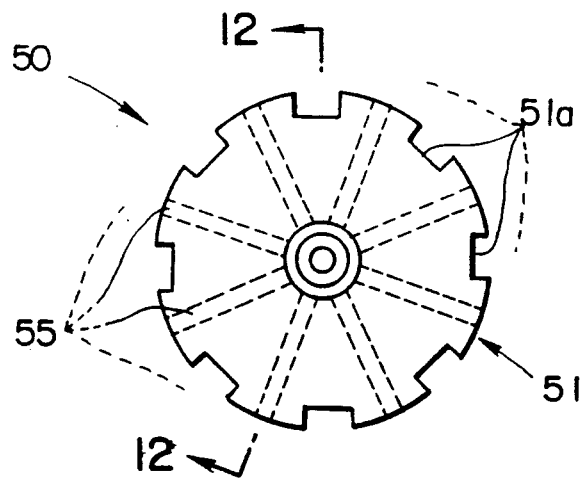
FIG. 11 is diagram of an end face of the electrodeposited reamer tool of the same.

Here, FIG. 9 shows results of a comparison between an electrodeposited reamer tool (referred to Tool No. 1) having #100 CBN abrasive grains secured on the outer peripheral surfaces of the finishing portion and the cutting portion, on the one hand, and an electrodeposited reamer tool (referred to as Tool No. 2) in which #100 CBN abrasive grains are secured on the finishing portion and trued and #80 CBN abrasive grains are secured on the cutting portion, on the other.

As is apparent from FIG. 9, it was found that, as for Tool No. 2, the processing length is extended by about 1.5-fold as compared with Tool No. 1. This is conceivably attributable to the fact that, with Tool No. 2 such as the one shown in FIG. 7, i.e., the electrodeposited reamer tool 30 in which the abrasive grains 36 having a large grain size are secured on the cutting portion 34, chip pockets, i.e., gaps between the abrasive grains, are large, so that a loading due to the cuttings is less likely to occur.

Meanwhile, with the electrodeposited reamer tool 30 in accordance with this embodiment, the abrasive grains 35 of the finishing portion 33 perform only the burnishing action, so that the diameter of the tool can be made smaller than a conventional electrodeposited reamer tool, and the finishing surface roughness can be improved. In addition, since the abrasive grains 36 of the cutting portion 34 have a large grain size, the machining allowing can be made large, so that a plurality of machining processes, such as the insertion of two tools that has hitherto been practiced, can be dispensed with.

Figure 8:
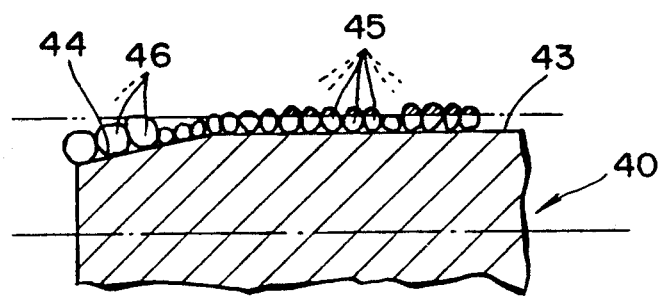
FIG. 8 is a cross-sectional side view of an essential portion in accordance with a fourth embodiment illustrating a state in which the abrasive grains are subjected to truing.

In an electrodeposited reamer tool 40 in accordance with a fourth embodiment shown in FIG. 8, abrasive grains 46 having a large grain size are secured only on a distal end portion of an outer peripheral surface of a cutting portion 44, while abrasive grains 45 having a small grain size are secured on an outer peripheral surface of the cutting portion 44 following the distal end portion thereof as well as on the outer peripheral surface of the finishing portion 43, and only the abrasive grains 45 secured on the finishing portion 43 are trued. The other arrangements are basically similar to those of the electrodeposited reamer tool 30 of the third embodiment. Incidentally, the abrasive grains 45 are #100 CBN abrasive grains, while the abrasive grains 46 are #80 CBN abrasive grains.

Here, if a comparison is made between the above-described electrodeposited reamer tool 40 (referred to as Tool No. 3) on the one hand, and Tool No. 1 and Tool No. 2 on the other, it was found that, as for Tool No. 3, the processing length is extended slightly more than Tool No. 2, as shown in FIG. 9.

The reason for this is conceivably attributable to the fact that since the abrasive grains with a large grain size that are located in the vicinity of a boundary between the finishing portion 33 and the cutting portion 34 are not present, loading is less likely to occur.

Although in this embodiment a description has been given of an example in which #100 and #80 are used as the CBN abrasive grains, this selection is an example in which the surface roughness, roundness, and cylindricity are aimed at 2μ, and it goes without saying that various modifications are possible depending on the required accuracy.

FIGS. 10 to 20 illustrate a fifth embodiment of an electrodeposited reamer tool in accordance with the present invention.

In this electrodeposited reamer tool 50, a plurality of notches 51a, 51a, ... extending along a central axis thereof in such a manner as to divide an outer peripheral surface of a work processing portion 51 having a circular cross section into equal parts are formed in the processing portion 51.

In addition, abrasive grains are secured on external peripheral surfaces of a finishing portion 52 and a cutting portion 53 in the work processing portion 51 by means of electrodeposition.

Furthermore, in the aforementioned electrodeposited reamer tool 50, an oil supplying passage 54 is provided along a central axis of rotation, and a plurality of oil holes 55, 55, ... , which communicate between the oil supplying passage 54 and portions of the outer peripheral surface of the cutting portion 53 wherein the notches 51a are not formed, are formed.

Figure 12:
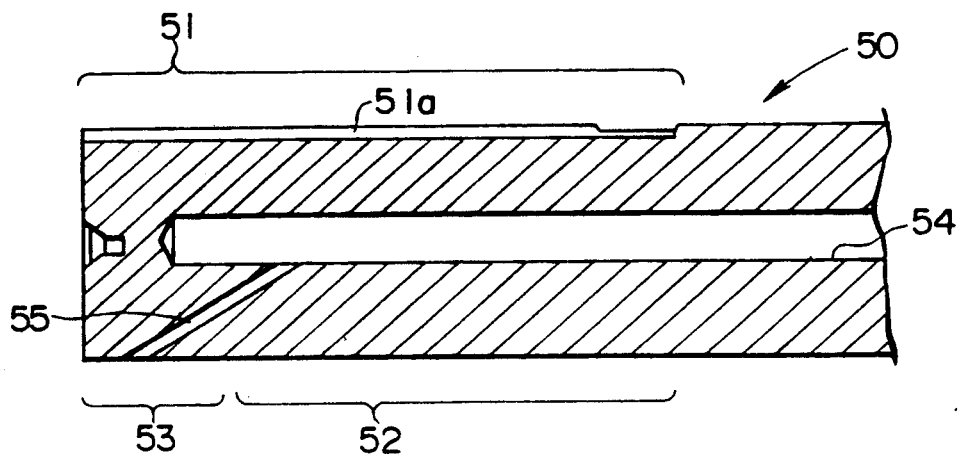
FIG. 12 is a cross-sectional view taken along the line A—A of FIG. 11.

As clearly shown in FIG. 12, the aforementioned oil holes 55 are provided in such a manner as to extend in a direction of opening from the oil supplying passage 54 toward the tip of the tool, i.e., by being inclined diagonally toward the tip with respect to the central axis of rotation, and are open substantially in a longitudinal center of the outer peripheral surface of the cutting portion 53.

If bore processing is effected by means of the electrodeposited reamer tool 50 having the above-described construction, the cutting portion 53 first enlarges a prepared hole provided in a work.

At this time, since the cutting portion 53 handles most of the bore processing, the machining load is large, and a loading due to cuttings is most likely to occur.

However, since a working fluid is supplied to the aforementioned cutting portion 53 through the oil supplying passage 54 and the oil holes 55, the cuttings adhering to the cutting portion 53 are carried away by this working fluid.

In addition, since the oil holes 55 are open in the outer peripheral surface of the cutting portion 53, the oil holes 55 can apply a constant working fluid pressure to a processing point. Incidentally, the supply of the working fluid to the outer peripheral surface at the work processing portion 51 other than the work processing point is effected by the notches 51a from outside the tool 50.

Figure 13:
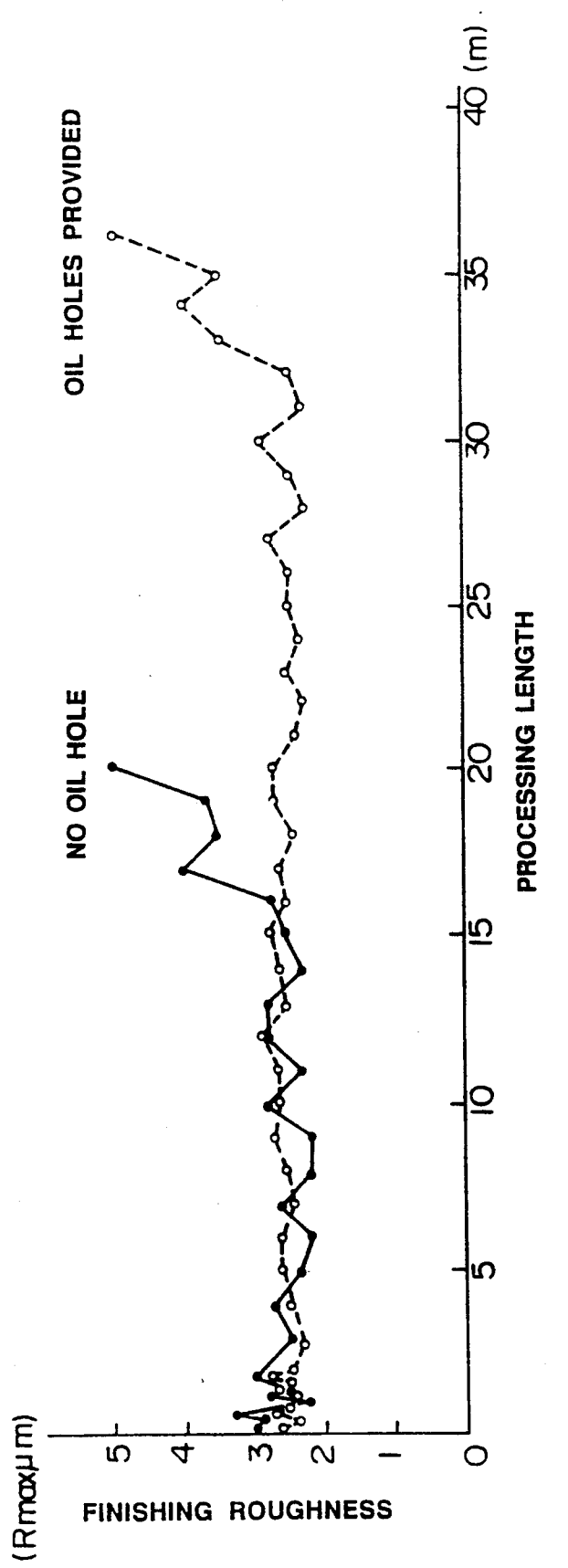
FIG. 13 is a graph illustrating the relationships between the finishing roughness and the processing length.

FIG. 13 shows a comparison between the electrodeposited reamer tool 50 of this embodiment and a conventional electrodeposited reamer tool not provided with the oil holes, through a graph on the relationships between the processing length and the finishing surface roughness. The graph shows that, with this embodiment, i.e., the electrodeposited reamer tool provided with the oil holes, since the loading due to cuttings is reduced, the processing length is prolonged before the finishing surface roughness begins to deteriorate. In other words, with the tool which is not provided with the oil holes, it is difficult to upgrade the levels of processing conditions owing to the loading caused by the cuttings, but it is possible to upgrade the levels of processing conditions by the provision of the oil holes.

In addition, although it has been difficult to effect electrodeposited reamer processing with respect to materials such as Al and Ni alloys, which produce long cuttings, processing can now be effected by the provision of the oil holes, although the processing conditions are restricted.

FIGS. 14 to 18 illustrate a sixth embodiment of an electrodeposited reamer tool in accordance with the present invention.

Figure 14:
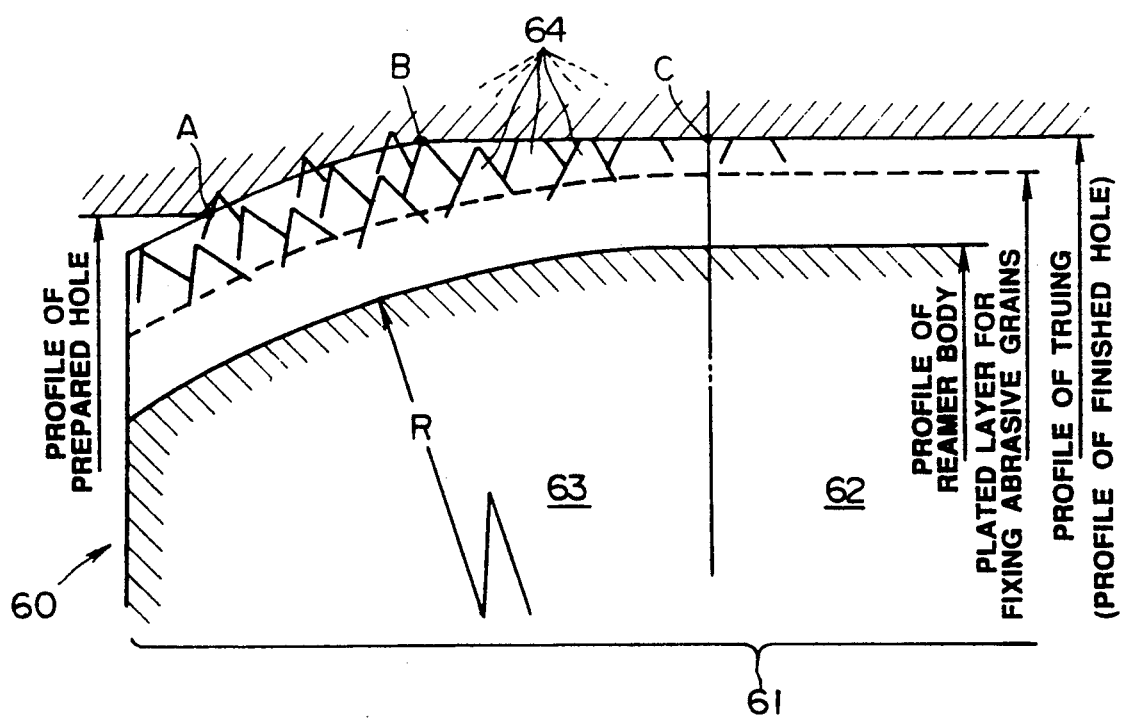
FIG. 14 is a cross-sectional side view of an essential portion of an electrodeposited reamer tool illustrating a sixth embodiment.

As shown in FIG. 14, an electrodeposited reamer tool 60 is constructed such that a work processing portion 61 is constituted by a finishing portion 62 having a cylindrical outer peripheral surface and a cutting portion 63 in which its outer peripheral surface is formed into a shape of R in its axial cross section, abrasive grains 64 being electrodeposited on outer peripheral surfaces of both portions 62, 63. The abrasive grains secured on the finishing portion 62 are trued, and roughing is effected between points A - B in FIG. 13, medium finishing is effected between points B - C, and finishing is effected subsequent to point C of the trued finishing portion 62.

Meanwhile, as shown in FIGS. 15 - 18, formed in an outer peripheral surface of a reamer body of the aforementioned electrodeposited reamer tool 60 are a plurality of notches 61a, 61a, . . . extending along a central axis of rotation. In addition, an oil supplying passage 65 is provided in the electrodeposited reamer tool 60 along the central axis of rotation, and oil holes 66 communicating between the oil supplying passage 65 and the outer peripheral surface of the work processing portion 61 are formed. In addition, oil reservoirs 67 in which the oil holes 66 are open are formed in the outer peripheral surface of the work processing portion 61.

Figure 19:
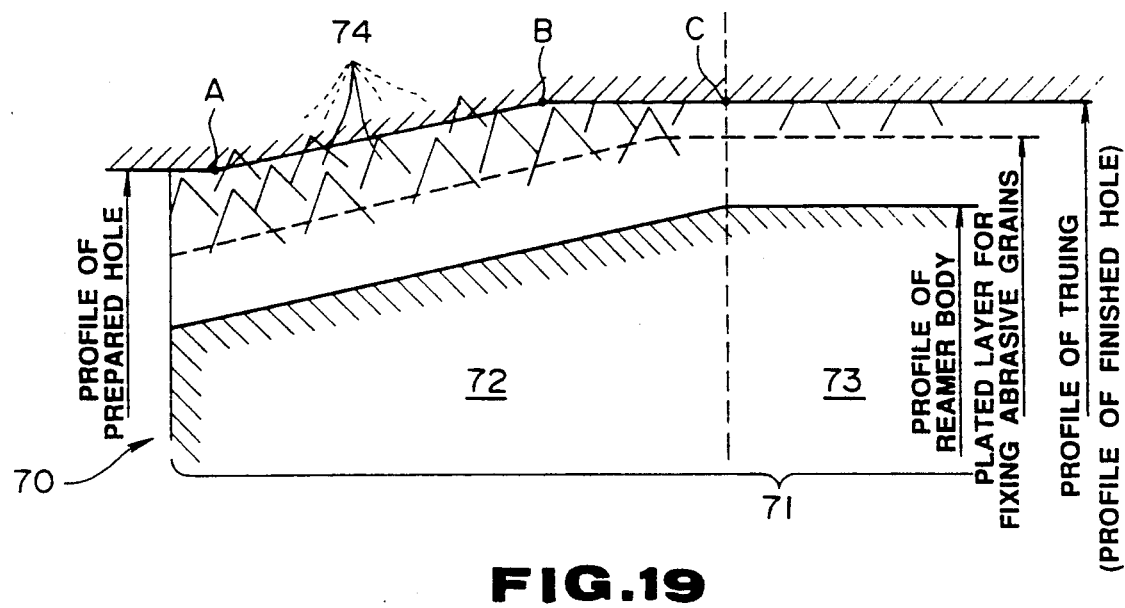
FIG. 19 is a cross-sectional view of the essential portion of the electrodeposited reamer tool in which an outer peripheral surface of the cutting portion is formed into a rectilinear configuration in an axial section.

Here, FIG. 19 illustrates an electrodeposited reamer tool 70 in accordance with the present invention, wherein the outer peripheral surface of a cutting portion 72 in a work processing portion 71 is formed into a rectilinear line in its axial cross section.

The work processing portion 71 in this electrodeposited reamer tool 70 is divided into the cutting portion 72 for mainly effecting roughing and a finishing portion 73 for effecting finishing. In addition, since there are invariably variations in the grain size of electrodeposited abrasive grains 74, the number of abrasive grains which actually act in processing is greater between points B - C in a rear half section of the cutting portion 72 than between points A - B in a forward half section thereof, and the size of chip pockets becomes smaller to the contrary. The section between these points B - C is important as a portion for handling processing which corresponds to medium processing, and it is necessary to permit a smooth shift from roughing (between points A - B) to finishing (subsequent to point C). In order to stabilize the processing between points B - C, it is necessary to widen that range. However, this would require an angle of taper to be very small at 1 degree or less in terms of the configuration of a taper, so that the manufacture has been difficult, and it has been necessary to provide a large allowance for tool withdrawal. Furthermore, if the levels of working conditions are further upgraded, a loading occurs between points B - C owing to the cuttings, so that this loading cannot be sufficiently suppressed even if oil holes are provided in the cutting portion 72.

In contrast, with the electrodeposited reamer tool 60 of the sixth embodiment, by providing an arrangement, as shown in FIG. 14, in which the work processing portion 61 is constituted by the finishing portion 62 (subsequent to point C) having the cylindrical outer peripheral surface and the cutting portion 63 (between points A - C) in which its outer peripheral surface is formed into the shape of R in its axial cross section, the range of medium finishing in the intermediate section (between points B - C) can be enlarged than the aforementioned electrodeposited reamer tool 70.

In addition, the number of the abrasive grains 64 and the size of the chip pockets change two-dimensionally from roughing (between points A - B) to finishing (subsequent to point C). Thus, the processing condition changes more smoothly than the electrodeposited reamer tool 70, and the more the processing point approaches the point C, the smaller the rate of change and the more stable finishing can be performed.

Here, Table 2 shows a comparison between a case in which bore processing is effected by using the electrodeposited reamer 60 of the sixth embodiment and a case in which bore processing is effected by using the electrodeposited reamer tool 70 shown in FIG. 19.

TABLE 2

|  | Electro-deposited Reamer Tool 70 | Electro-deposited Reamer Tool 60 | Processing Conditions |
|---|---|---|---|
| Surface roughness | Ry 2 μm | Ry 1.5 μm | Processing dimensions: P21 × 45l |
| Cylindricity | 2 μm | 1.2 μm | Material to be cut: FC25 |
| Roundness | 2 μm | 1.3 μm | Feed: 2 mm/rev. |
| Straightness | 3 μm/45 mm | 3 μm/45 mm | Cutting speed: 20 m/min. |
| Tool life | 32 m | 48 m | Cutting allowance: 100 μm/ϕ |

As is apparent from the foregoing Table, it was found that, in accordance with the electrodeposited reamer tool 60 of this embodiment, given the same processing conditions, the surface roughness, cylindricity, and roundness can be improved, and the tool life is prolonged by about 1.5-fold that of the electrodeposited reamer tool 70.

Meanwhile, at the time when bore processing is effected by means of the electrodeposited reamer tool 60, since the working fluid is supplied to the work processing portion 61 via the oil supplying passage 65, the oil holes 66, and the oil reservoirs 67, the cuttings adhering to the work processing portion 61 are carried away, with the result that the loading of the work processing portion 61 is suppressed.

Figure 20:
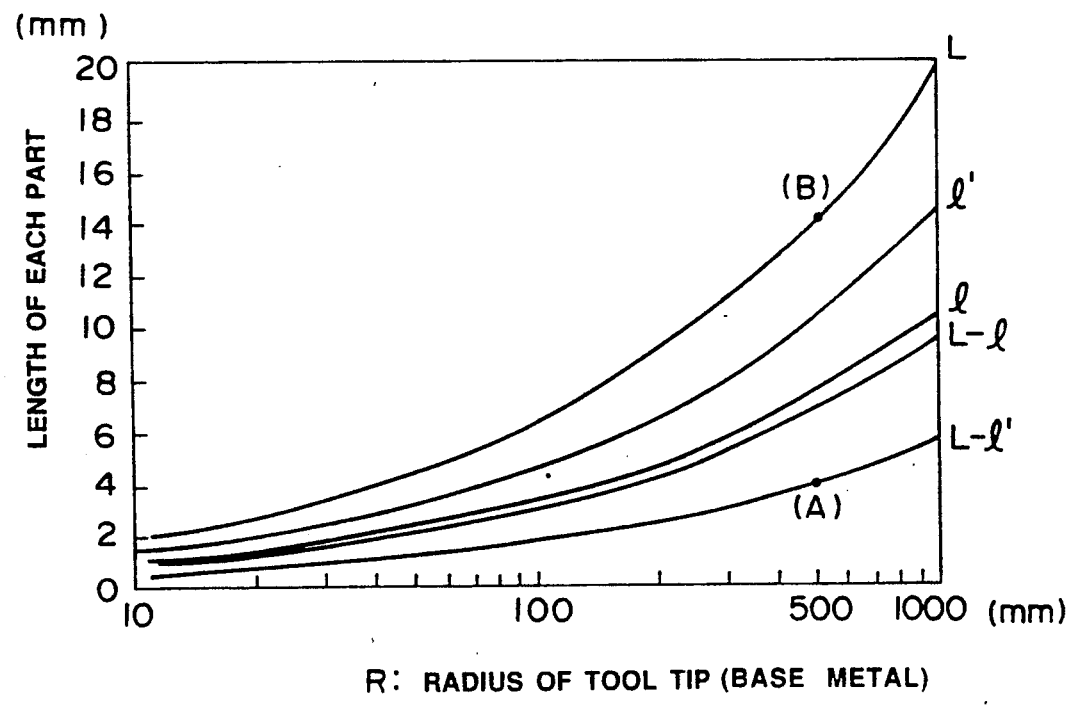
FIG. 20 is a diagram of calculation for determining positions of oil holes.
Figure 21:
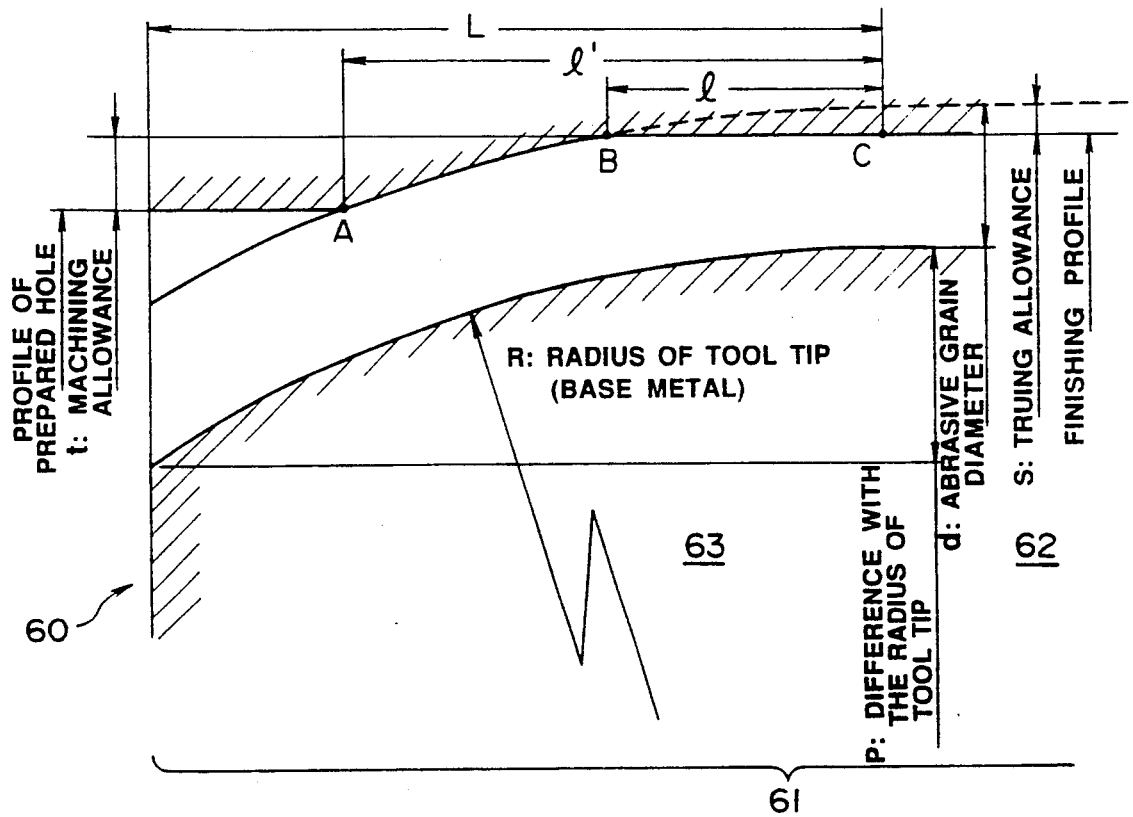
FIG. 21 is a diagram explaining the name of each portion of a work processing portion.
Figure 22:
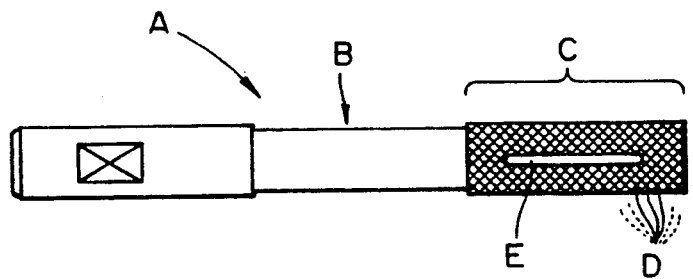
FIG. 22 is an overall side-elevational view illustrating a conventional electrodeposited reamer tool.

Here, FIG. 20 is a diagram for calculating the positions at which the oil holes 66 are formed in the electrodeposited reamer tool 60, the abscissas show the radius (mm) of the tip of the tool (base metal), while the ordinates show the length (mm) of each portion from the tip of the tool. FIG. 21 is a diagram explaining each portion of the work processing portion 61, where it is assumed that

| Machining allowance (radius) | 0.05 mm (t) |
|---|---|
| Average diameter of abrasive grains used | 0.22 mm (d) |
| Amount of truing (radius) | 0.055 mm (s) |
| Difference with the radius of tool tip | 0.2 mm (p) |
| Radius of tool tip (base metal) | R | then,

Length of R portion ... $L = R \cdot \sin\left(\cos^{-1}\frac{R-P}{R}\right)$

Position of portion A ...

$l' = (R + d) \cdot \sin\left(\cos^{-1}\frac{R + (d - s - t)}{R + d}\right)$

Position of portion B ...

$l = (R + d) \cdot \sin\left(\cos^{-1}\frac{R + (d - s)}{R + d}\right)$

In the case of a blind bore processing, if it is assumed that the allowance for tool withdrawal is allowed up to 15 mm, it is necessary to provide 500 mm or less as the radius of the tool tip, R, on the basis of FIG. 20. If R = 500 mm, the portion of the tool for handling roughing and medium finishing is the range from point (A) on the L - l' curve to point (B) on the L-curve in FIG. 20. Accordingly, it can be appreciated that an optimum position for providing an oil hole is at a position of 4-14 mm from the tool tip.

INDUSTRIAL APPLICABILITY

The electrodeposited reamer tool in accordance with the present invention can be applied effectively when precision bore processing is performed on various works.

We claim:

1. An electrodeposited reamer tool characterized by:
   a finishing portion having a cylindrical outer peripheral surface; and
   a cutting portion provided on an end side of said finishing portion, an outer peripheral surface in an axial cross section of said cutting portion being curved so as to have a tapered configuration,
   wherein abrasive grains are electrodeposited on said outer peripheral surface of said finishing portion and said outer peripheral surface of said cutting portion, the abrasive grains electrodeposited on said finishing portion are being trued; and
   wherein abrasive grains having a grain size greater than that of said abrasive grains electrodeposited on said outer peripheral surface of said finishing portion are electrodeposited on at least an end portion of said outer peripheral surface of said cutting portion.

2. An electrodeposited reamer tool according to claim 1, wherein said cutting portion is provided with a ceramic coating.

3. An electrodeposited reamer tool according to claim 1, wherein a plurality of notches extending along a central axis of rotation are formed on said outer peripheral surfaces of said finishing portion and said cutting portion.

4. An electrodeposited reamer tool according to claim 1, wherein there are provided an oil supplying passage extending along a central axis of rotation and an oil hole communicating between said oil passage and said outer peripheral surface of said cutting portion.

5. An electrodeposited reamer tool according to claim 4, wherein said oil hole is provided in such a manner as to extend by being inclined diagonally toward the tip with respect to said central axis of rotation.

6. An electrodeposited reamer tool according to claim 4, wherein an oil reservoir in which said oil hole is open is formed on said outer peripheral surface of said cutting portion.

7. An electrodeposited reamer tool according to claim 6, wherein said oil hole is formed and a length of said oil reservoir are determined by conditions including a diameter of a prepared hole in a work, a finished diameter, an allowance for tool withdrawal, and a radius of a tool tip.

* * * * *